J. W. HOOVER.
KAFIR CORN HEADER.
APPLICATION FILED JUNE 29, 1914.
1,138,953.
Patented May 11, 1915.
2 SHEETS—SHEET 2.
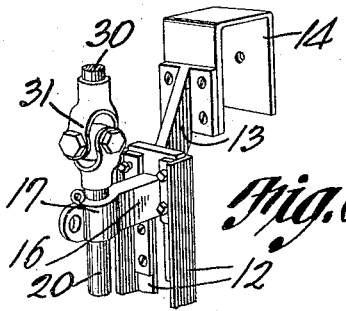
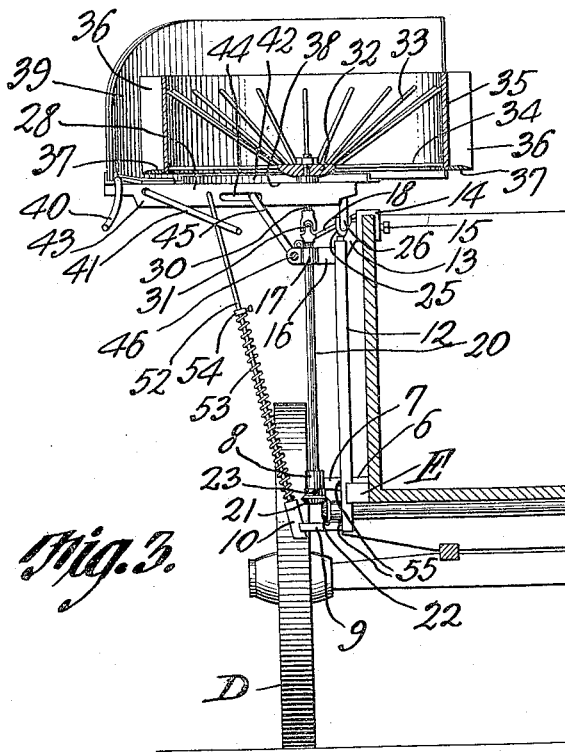
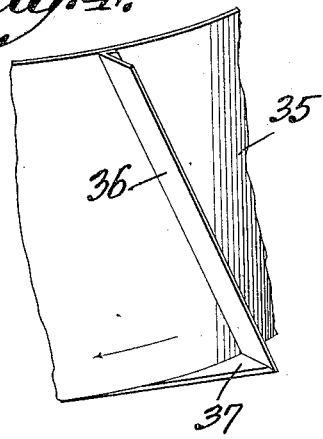
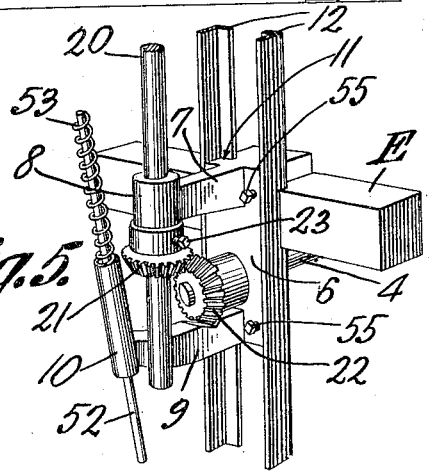
Witnesses
J. W. Hoover, Inventor
by C. A. Snow & Co.
Attorneys

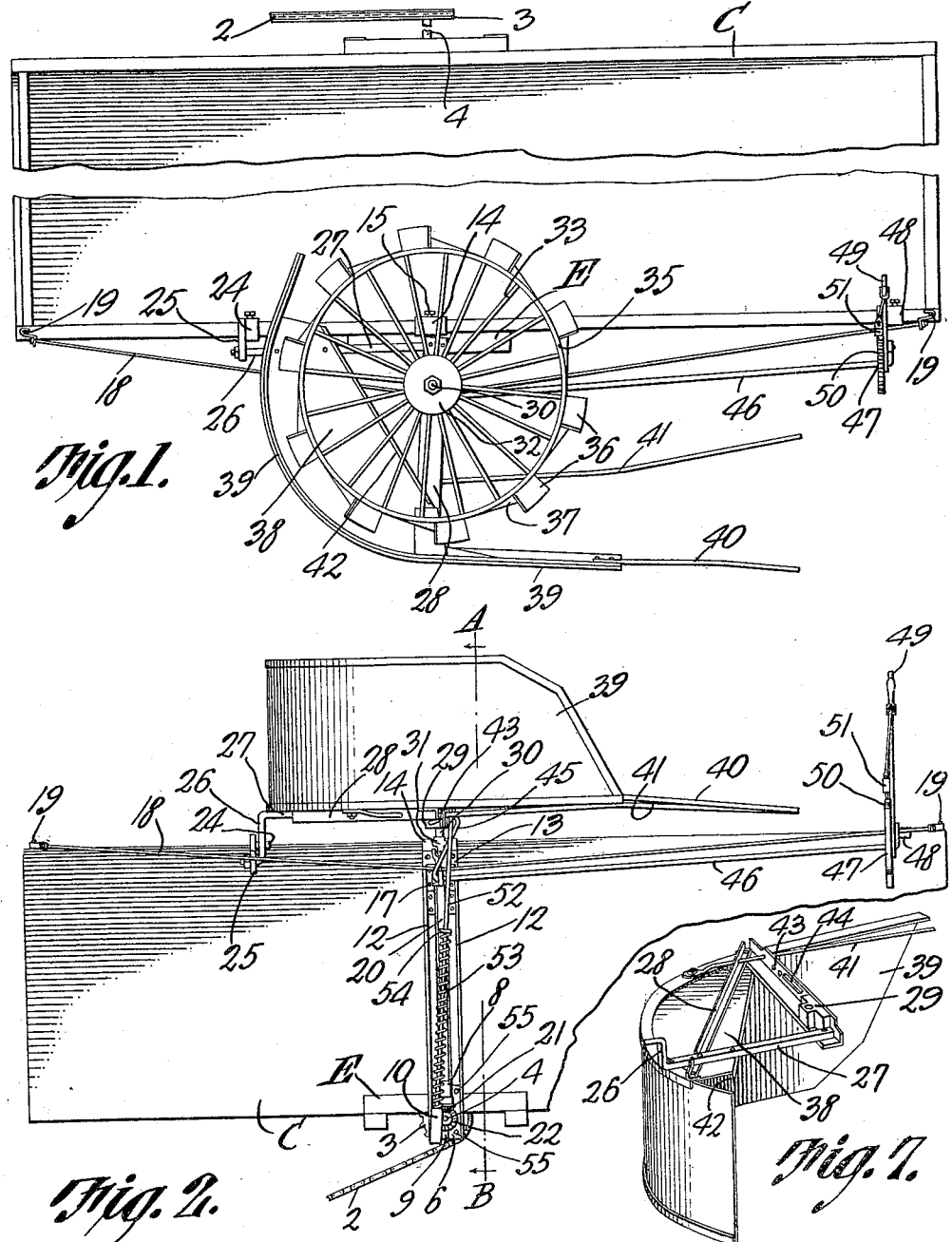

UNITED STATES PATENT OFFICE.

JOSEPH W. HOOVER, OF WINFIELD, KANSAS.

KAFIR-CORN HEADER.

1,138,953.   Specification of Letters Patent.   Patented May 11, 1915.

Application filed June 29, 1914. Serial No. 847,998.

*To all whom it may concern:*

Be it known that I, JOSEPH W. HOOVER, a citizen of the United States, residing at Winfield, in the county of Cowley and State of Kansas, have invented a new and useful Kafir-Corn Header, of which the following is a specification.

This invention relates to Kafir corn headers, one of its objects being to provide a simple, compact and efficient structure in the form of an attachment adapted to be applied readily to one side of a wagon box and to receive motion from one of the supporting wheels of a wagon whereby, when the wagon is propelled forward, the parts of the header will be operated to sever the heads and direct them into the wagon box or body to which the attachment is connected.

A further object is to provide means constantly under the control of the operator whereby the said header can be adjusted angularly in a vertical plane, thus to adapt it for use under varying conditions.

A further object is to provide a combined header and reel, the header including knives operating upon the same principle as a scythe and the reel being adapted to pick up the severed heads and throw them laterally into the wagon box or body.

A further object is to provide a structure of this character which is formed of but few parts and will not readily get out of order and the cutting elements of which will not become entangled with vines, etc.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a wagon body having the present improvements combined therewith. Fig. 2 is a side elevation of the structure shown in Fig. 1. Fig. 3 is a section on line A—B Fig. 2. Fig. 4 is a perspective view of a portion of the reel and showing one of its peripheral blades and one of the knives. Fig. 5 is a perspective view of a part of the supporting structure and a part of the driving mechanism. Fig. 6 is a perspective view of the upper end portion of the vertical shaft and adjacent parts. Fig. 7 is a perspective view of the triangular frame and adjacent parts inverted.

Referring to the figures by characters of reference C designates a wagon box or body, the same being provided with supporting wheels D as ordinarily. Connected to one of these wheels is a sprocket 1 and motion is transmitted from this sprocket through a chain 2 to a smaller sprocket 3 secured to the transverse shaft 4 of the attachment. This shaft is journaled adjacent one end within a bearing 5 secured to the bottom portion of the box C while its other end portion is journaled within a hanger 6 which can be secured to the usual step E attached to the side of the body or box C. This hanger 6 has an outstanding arm 7 the outer end of which is enlarged to form a bearing 8. Another lower arm 9 also extends outwardly from the hanger and is provided, at its outer or free end, with a guide sleeve 10. Channels 11 are formed in the sides of the hanger 6 and adjustably mounted within these channels are the inwardly extended flanges of parallel angle strips 12. These angle strips are connected, at their upper ends, to a bracket 13 which includes an inverted yoke 14 designed to straddle the upper edge portion of one side of the box or body C, there being a set screw 15 or the like for binding said yoke 14 upon said wall. An arm 16 extends outwardly from the hanger 13 and has an enlargement 17 forming a bearing. A truss rod 18 is secured at an intermediate point to the arm 16 and the ends of this truss rod are connected adjustably to bolts 19 or the like upstanding from the side of the box or body C.

A vertical shaft 20 is journaled in the bearings 8 and 17 and is provided, adjacent its lower end, with a bevel gear 21 designed to mesh with a corresponding gear 22 secured to the shaft 4. Gear 21 is connected to the shaft 20 by means of a set screw 23 or the like, and by loosening this set screw, the shaft 20 can be adjusted downwardly or upwardly relative to the gear 21.

A yoke 24 is secured upon the upper edge portion of one side of the body C and has an outstanding arm 25 in which a crank 26 is mounted for rotation, this crank being formed at one end of a bar 27, forming a portion of a triangular frame 28. This frame is provided with a bearing 29 in which is journaled a short shaft 30 connected, by a universal joint 31, to the upper end of the shaft 20. Shaft 30 extends above the frame 28 and has its upper end secured to a hub 32 from which radiate two series of spokes 33 and 34, the series 34 diverging outwardly from the series 33 and both series of spokes being connected to the rim 35 of a reel. Outstanding from the rim of the reel are inclined blades 36 extending from the upper to the lower edges of the rim and outstanding from the lower edge of the rim are cutting blades 37 the active edges of which are tangentially disposed. A segmental platform 38 is mounted on the frame 28 so as to extend under the rear portion of the reel, this platform being provided, along its outer edge, with an upstanding wall or guard 39 concentric with the reel, and having one end portion overhanging one side of the box or body C while its other end portion extends forwardly at a point beyond the outermost portion of the reel. This forwardly extending portion projects beyond the platform 38, as shown in Fig. 1, and has a gathering finger 40 secured thereto and extending forwardly therefrom. Another gathering finger 41 extends forwardly from the frame 28 and coöperates with the finger 40 and the projecting portion of the wall 39 to form a throat into which the corn is received while being directed against the reel.

The platform 38 is disposed close to the lower edge of the reel and, if desired, can be provided with a slight upstanding flange 42 extending from the outer to the inner end thereof.

One of the members of the frame 28 has a depending flange 43 and formed in this flange is a longitudinal slot 44 slidably engaged by a crank arm 45 formed at or secured to one end of an actuating shaft 46. This shaft is journaled in the arm 16 and also in an arm 47 outstanding from a yoke 48 which straddles and is secured to one side of the box or body C. An actuating lever 49 is secured to the shaft 46 and means, such as a segment 50 and a pawl 51 are provided for locking the lever 49 in any position to which it may be adjusted. By means of this lever 49, shaft 46 can be rotated and crank arm 45 caused to swing upwardly and downwardly, thereby causing the frame 28 and the parts connected thereto, to swing upwardly and downwardly about an axis determined by the bearing of crank arm 26 and the universal joint 31.

A rod 52 is pivotally connected to the flange 43 and is slidably mounted in the sleeve 10. A coiled spring 53 extends around the lower portion of the rod 52 and bears at one end against the sleeve 10 and at its other end against a collar 54 which is adjustably mounted on the rod. This spring 53 acts as a cushion for yieldingly supporting the frame 28.

When the wagon is drawn forward, the fingers 40 and 41 will gather the standing corn and direct it into the path of the blades 36 outstanding from the reel. Rotation of the wheel D will result in the actuation of the shaft 20 and, consequently, in the rotation of the reel. When the blades 36 engage the standing corn they will direct the same into the space between the wall 39 and the rim of the reel and at the same time the blades 37 outstanding from the reel will shear off the heads, the action being similar to that of an ordinary scythe. As soon as the heads are severed, the blades 36 will throw them inwardly along the inner surface of the wall 39 and above the platform 38 and direct them into the box or body C. By means of lever 49, the platform 38, the reel thereabove, and the frame 28 can be tilted or adjusted angularly thus to adapt it for use under varying conditions. When the header is tilted downwardly, spring 53 is placed under compression and, when lever 49 is unlocked, this compressed spring will assist in returning the parts to their initial positions.

In applying the attachment to a wagon box or body, the distance between the yoke 14 and the shaft 4 can be varied by loosening the gear 21 on shaft 20 and by loosening set screws 55 which are provided for clamping the hanger 6 to the side strips 12. Said side strips 12 can thus be slid downwardly relative to the hanger 6 and shaft 20 will at the same time slide downwardly relative to the gear 21. This adjustment can be continued until yoke 14 is brought into position for engagement with the upper edge of the side of the box or body C. Obviously the parts can be adjusted upwardly in the same manner to increase the distance between yoke 14 and shaft 4. After the adjustment of the parts has been effected, the side strips 12 are secured to the hanger 6 by tightening the screws 55 and the gear 21 is secured to the shaft 20 by tightening the screw 23. Collar 54 can be adjusted along the rod 52 to compensate for any changes due to the adjustment of the parts 6 and 12 relative to each other.

What is claimed is:—

1. A corn heading attachment including a platform tiltably mounted, a deflecting wall upstanding from one side and the rear portion of the platform, a reel mounted for rotation above the platform and close to the wall, tangentially disposed shearing elements outstanding from the reel and movable over the platform, blades outstanding from the reel for engaging severed heads and directing them along the inner side of the wall, and means for actuating the reel.

2. A corn heading attachment including a platform tiltably mounted, an arcuate deflecting wall upstanding from the outer rear portion of the platform, a reel mounted for rotation above the platform and concentric with the wall, tangentially disposed shearing blades outstanding from the reel and movable over the platform, blades outstanding from the reel for engaging severed heads and directing them along the inner side of the wall, and means for rotating the reel irrespective of the angular adjustment of the reel and platform.

3. A corn heading attachment for vehicle bodies, including a platform, means for detachably connecting the platform to one side of a vehicle body, said platform being tiltably mounted, a deflecting wall upstanding from the platform, a reel mounted for rotation above the platform about an upwardly extending axis, means for gathering corn into the space between the reel and the wall, tangentially disposed shearing blades extending from the periphery of the reel, and means for rotating the reel independently of the angular adjustment of the reel and platform.

4. A corn heading attachment for vehicle bodies, including a platform, means for detachably connecting the platform to one side of a vehicle body, means for tilting the platform relative to the body, an arcuate deflecting wall upstanding from the platform, a reel mounted for rotation about an upwardly extending axis and above the platform, means for gathering corn into the space between the wall and reel, blades outstanding from the reel for directing the severed corn along the inner side of the wall and into the body of which the attachment is secured, tangentially disposed shearing blades outstanding from the reel and working above the platform, and means for rotating the reel independent of the angular adjustment thereof.

5. A corn heading attachment for vehicle bodies, including a drive shaft, means for transmitting motion thereto from a supporting wheel of a vehicle, means for adjustably and detachably engaging one side of a vehicle body, an upwardly extending shaft carried thereby and receiving motion from the first named shaft, a platform tiltably connected to said body engaging means, an upstanding deflecting wall upon the platform, a reel supported by the platform and mounted for rotation about an upwardly extending axis, there being a universal connection between said reel and the upwardly extending shaft, cutting blades outstanding from the lower portion of the reel, blades outstanding from the periphery of the reel for engaging severed heads and directing them along the upstanding wall, and means for gathering corn and directing it into the space between the reel and wall.

6. The combination with an adjustable structure for detachably engaging one side of a vehicle body, an upwardly extending shaft carried by said structure, and means for actuating the shaft from a wheel of a vehicle to which the structure is connected, of a platform mounted to tilt relative to said structure, a reel above and tiltable with the platform, a shaft revoluble with the reel, a universal joint connecting the upstanding shaft and the reel shaft, a deflecting wall upstanding from the platform and concentric with the reel, cutting blades outstanding from the lower portion of the periphery of the wheel and above the platform, blades outstanding from the reel and constituting means for directing cut material along the upstanding wall, a shaft, a crank arm thereon connected to and slidable relative to the platform, means for rotating the last named shaft to actuate the crank and tilt the platform, means for locking the platform in any position to which it may be tilted, and cushioning means for limiting the downward tilting movement of the platform.

7. The combination with a vehicle body and a hanger secured thereto, of side strips adjustable longitudinally upon the hanger, means for securing said strips against movement relative to the hanger, a yoke connected to the strips and detachably engaging one side wall of the body, a shaft parallel with and supported by the side strips, means for transmitting motion to said shaft from one of the supporting wheels of the vehicle, a yoke detachably engaging one side of the vehicle body, a bracket, an arm outstanding therefrom, a platform tiltably mounted upon said arm, a reel tiltable with the platform, a downwardly extending shaft connected to the reel, a universal joint connecting said shaft with the upstanding shaft and constituting a support for the platform, a deflecting wall upstanding from the platform, means upon the reel for severing material supplied to the space between the reel and wall, means upon the reel for conveying the severed material along the wall and into the body of the vehicle, and means for tilting the platform and reel independently of the rotation of the reel.

In testimony that I claim the foregoing as my own, I have hereto affixed my signature in the presence of two witnesses.

JOSEPH W. HOOVER.

Witnesses:
J. B. COLLIER,
G. S. BUSSART.